United States Patent
Doyle et al.

(10) Patent No.: US 6,933,967 B2
(45) Date of Patent: Aug. 23, 2005

(54) COLOR REFERENCE SYSTEM FOR DISPLAY MONITOR

(75) Inventors: Paul David Doyle, San Marcos, CA (US); Rafael Calderon, San Diego, CA (US); Matthew C. Boyko, San Francisco, CA (US); Roy Bragadeste, Round Rock, TX (US); Don Moore, Renton, WA (US); Mike McKay, Shoreline, WA (US); Karl Lang, Madison, WI (US); Andrew Bryant, San Diego, CA (US); Martin Kolinek, Bellevue, WA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 10/659,447

(22) Filed: Sep. 9, 2003

(65) Prior Publication Data

US 2004/0114041 A1 Jun. 17, 2004

Related U.S. Application Data

(60) Provisional application No. 60/409,720, filed on Sep. 10, 2002.

(51) Int. Cl.[7] .............................................. H04N 17/02
(52) U.S. Cl. ...................................... 348/189; 348/191
(58) Field of Search ................................ 348/182, 189, 348/190, 658, 181, 806, 191; 345/904

(56) References Cited

U.S. PATENT DOCUMENTS

| | | | | |
|---|---|---|---|---|
| 3,573,352 A | * | 4/1971 | Fujita | 348/658 |
| 4,001,877 A | * | 1/1977 | Simpson | 348/191 |
| 4,340,904 A | * | 7/1982 | Wingrove, Jr. | 348/657 |
| 4,518,986 A | | 5/1985 | Hinn et al. | |
| 4,700,218 A | * | 10/1987 | Thomsen et al. | 348/658 |
| 4,742,387 A | * | 5/1988 | Oshima | 348/658 |
| 5,321,494 A | * | 6/1994 | Donahue et al. | 356/218 |
| 5,371,537 A | | 12/1994 | Bohan et al. | |
| 5,655,143 A | | 8/1997 | Alpert et al. | |
| 6,067,166 A | | 5/2000 | Fox et al. | |
| 6,285,397 B1 | * | 9/2001 | Webb et al. | 348/189 |
| 6,459,485 B1 | | 10/2002 | Tsurutani | |
| 6,549,183 B1 | * | 4/2003 | Koyama | 345/92 |
| RE38,537 E | * | 6/2004 | Kim | 345/13 |
| 6,744,464 B2 | * | 6/2004 | Huang | 348/182 |

* cited by examiner

Primary Examiner—Victor R. Kostak
(74) Attorney, Agent, or Firm—Blakely, Sokoloff, Taylor & Zafman LLP

(57) ABSTRACT

A color calibration system includes a visual display terminal (VDT), a color calibration sensor optically coupled to the VDT, and a computer processing unit (CPU) electrically coupled to the VDT and the color calibration sensor. The VDT has a display screen and a plurality of color channels, each color channel having an intensity input, a bias input, and a gain input. The VDT produces an image on the display screen responsive to the intensity input. The color calibration sensor provides values responsive to the chromaticity and luminance of a test patch portion of the image on the display screen. The CPU performs calibration of the VDT including setting the bias of each color channel to reduce the difference between a target black point and the test patch with the intensity input at a minimum value for each color channel.

22 Claims, 4 Drawing Sheets

COLOR REFERENCE SYSTEM FOR DISPLAY MONITOR

CROSS REFERENCE TO RELATED APPLICATIONS

This application claims the benefit of U.S. Provisional Application No. 60/409,720, filed Sep. 10, 2002.

BACKGROUND OF THE INVENTION

Visual display terminals (VDTs) for use in color critical applications such as digital photography or publication soft-proofing must provide an accurate and consistent visual color reference. The VDT converts a digital representation of a color into an appropriate optical output. The digital representation of a color may use any of a variety of color space models, such the RGB color space. The digital representation may have any desired resolution, such as a 24 bit representation of a pixel that provides for 256 levels for each of red, green, and blue levels. The optical output may be produced by any of a variety of technologies for producing a full color visual display, such as cathode ray tube (CRT), liquid crystal display (LCD), light valve technology (LVT), plasma display, digital light processing (DLP), and liquid crystal on silicon (LCOS).

The optical output that results from a given digital input is subject to a variety of variables. If the VDT is to perform satisfactorily for color critical applications, the VDT should be calibrated to provide an accurate and consistent optical output in response to the digital inputs.

SUMMARY OF THE INVENTION

A color calibration system includes a visual display terminal (VDT), a color calibration sensor optically coupled to the VDT, and a computer processing unit (CPU) electrically coupled to the VDT and the color calibration sensor. The VDT has a display screen and a plurality of color channels, each color channel having an intensity input, a bias input, and a gain input. The VDT produces an image on the display screen responsive to the intensity input. The color calibration sensor provides values responsive to the chromaticity and luminance of a test patch portion of the image on the display screen. The CPU performs calibration of the VDT including setting the bias of each color channel to reduce the difference between a target black point and the test patch with the intensity input at a minimum value for each color channel.

DETAILED DESCRIPTION OF THE INVENTION

Figure 1:
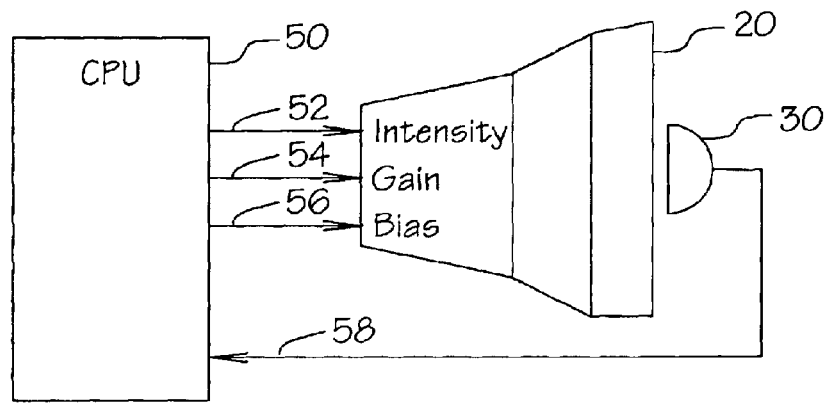
FIG. 1 is a block diagram of a color calibration system.

The invention provides a system for calibrating a visual display terminal (VDT) for use in color critical applications. FIG. 1 shows the system including a VDT 20, a color calibration sensor 30 to detect the light output of the VDT, and a central processing unit (CPU) 50 to use the sensor signals to calibrate the VDT. The intensity input 52 produces the images displayed on the VDT. The intensity input 52 may be a set of analog lines that provide voltage levels proportional to the desired light output. The bias 54 and gain 56 inputs control the response of the VDT's color channels to provide an accurate and consistent optical output in response to intensity input 52. The bias 54 and gain 56 inputs may be provided to the VDT by the CPU as digital messages that set register values in the VDT. The register values may provide a persistent setting of the circuitry in the VDT that creates the display image based on the intensity input 52.

The VDT 20 employs a plurality of color channels to produce a color display. For example, the VDT may use a color cathode ray tube (CRT) that uses three electron guns to cause red, green, and blue phosphors to fluoresce. Each of the electron guns with its associated circuitry and phosphors makes up one of the color channels. The phosphors will produce a light output that varies according to the incident energy provided by the electron guns. Other embodiments of the invention may use other technologies for producing a full color visual display.

The output light levels produced by the plurality of color channels can be controlled to produce a full color display on the VDT 20. The VDT may receive an intensity input to control the light level produced. The intensity input may include a signal for each of the color channels. The intensity input may provide an intensity that varies depending on the location on the screen to form a desired image. The intensity input may provide an intensity that further varies with time to provide moving or changing images.

The intensity input 52 to the VDT 20 controls the output signal which in turn controls the light output. To provide an accurate and consistent optical output in response to intensity input 52, it is necessary to periodically calibrate the VDT to provide the desired light output in response to the intensity input 52. The circuitry in the VDT that creates the display image based on the intensity input 52 may respond to the intensity input in a non-linear manner.

Figure 2:
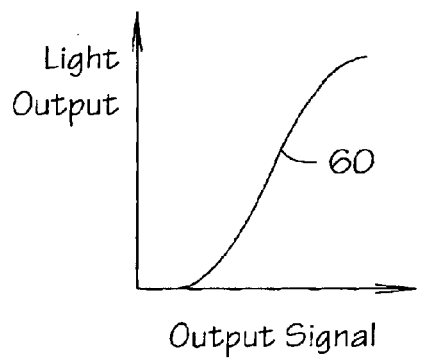
FIG. 2 is a graph illustrating a relationship between an electrical output signal and a resulting light output in a VDT.

FIG. 2 illustrates a possible relationship 60 between the electrical output signal produced by the VDT circuits that receive the intensity input and the light output that results from the output signal. It will be observed that the output signal may need to be above a threshold value before any light output is produced. There may also be a maximum light output that can be produced and further increases in the output signal beyond that output level will produce no visible change in the output. The VDT may not be capable of producing an output signal that reaches the maximum light output as that may represent an undesirable operating condition.

The VDT 20 in the inventive system provides bias inputs 56 and gain inputs 54 that adjust the output signal produced in response to the intensity input 52. There may be an overall bias input that affects all color channels and an additional bias input for each color channel. The overall bias input may be referred to as brightness input. Likewise, there may be an overall gain input that affects all color channels and an additional gain input for each color channel. The overall gain input may be referred to as contrast input.

Figure 3:
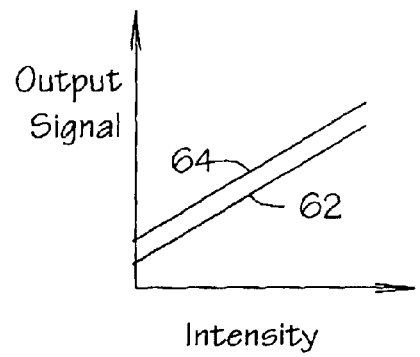
FIG. 3 is a graph illustrating the effect of bias on a relationship between an intensity input signal and resulting electrical output signals in a VDT.

As shown in FIG. 3, the bias input 56 controls the overall level of the output signal without regard to the intensity input 52. An output signal 64 that has a greater bias level produces a stronger output signal for a given intensity input than an output signal 62 with a lower bias level. Increasing the bias will cause the resulting light output to be greater for all intensity inputs. If considered in the context of all channels being used equally to produce levels of gray, increasing bias will cause both black and white to be brighter and decreasing bias will cause both black and white to be darker.

Figure 4:
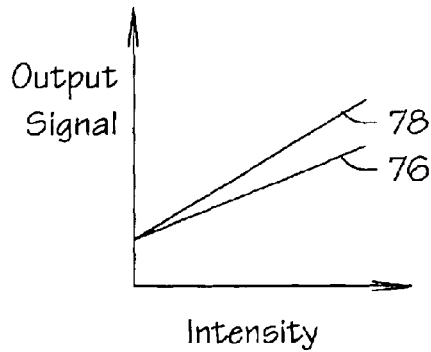
FIG. 4 is a graph illustrating the effect of gain on a relationship between an intensity input signal and resulting electrical output signals in a VDT.

As shown in FIG. 4, the gain input 54 controls the level of the output signal 76 in proportion to the intensity input 52. As the gain is increased 78, the range of the output levels will increase. Referring again to the gray context, increasing gain will increase the difference between white and black.

Figure 5:
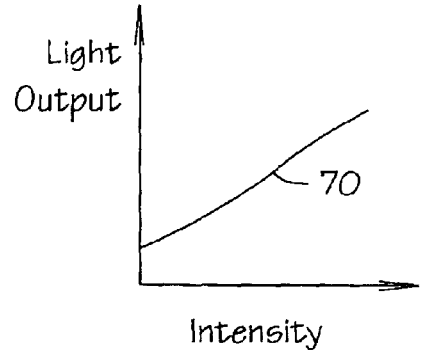
FIG. 5 is a graph illustrating the effect of gain on a relationship between an intensity input signal and resulting electrical output signals in a VDT.

As shown in FIG. 5, the calibration process attempts to set the bias and gain so that the light output 70 at the extreme ends of the intensity input range produce target white and black values. The calibration process also attempts to balance the output of the color channels so that the white and black target points have the same chromaticity (color).

Figure 6:
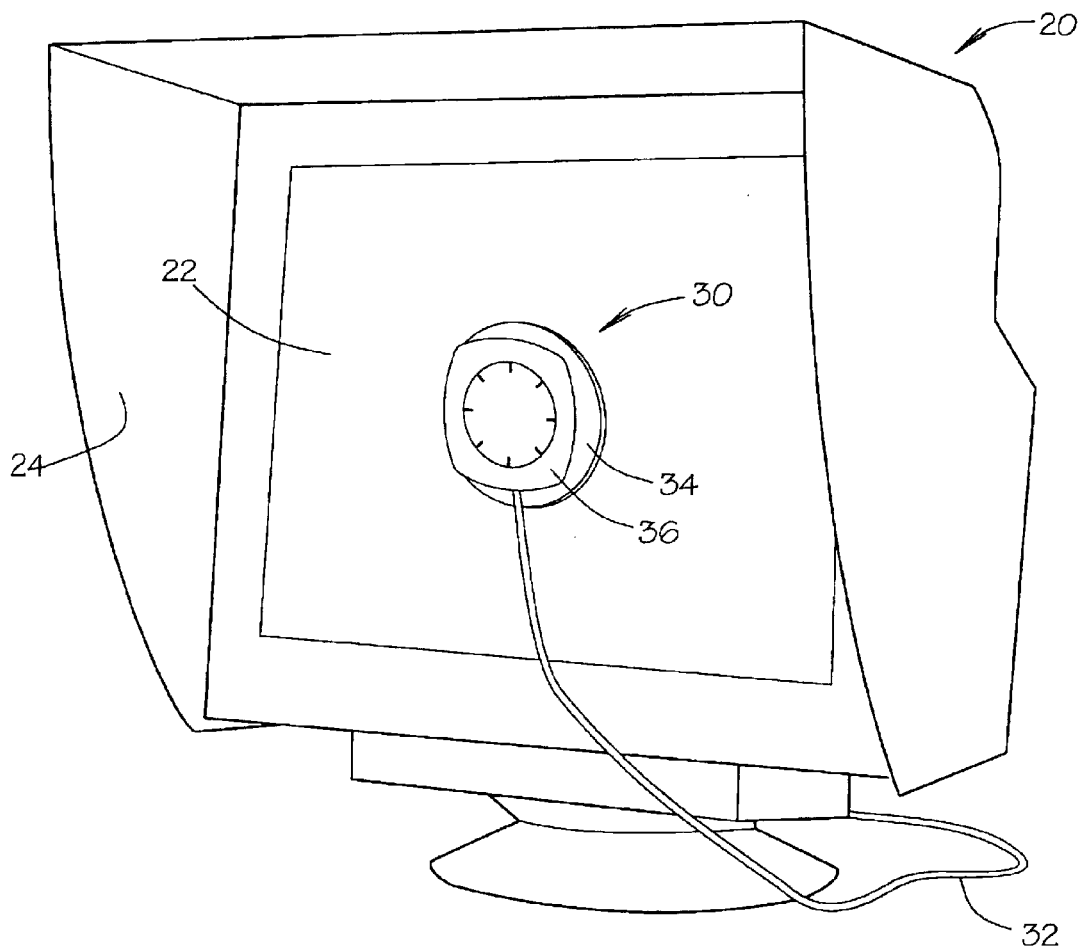
FIG. 6 is a perspective view of a VDT with an attached color calibration sensor.

FIG. 6 shows an exemplary arrangement of the VDT 20 and the color calibration sensor 30. The VDT 20 includes a display screen 22 on which the visible light output is produced. The VDT may include a light hood 24 to shield the display screen 22 from incident ambient light which will alter the user's perception of images on the display screen. The VDT is connected to a CPU 50 (FIG. 1) that provides the intensity input signals 52, the gain signals 54, and the bias signals 56 to the VDT.

The color calibration sensor 30 is positioned on the display screen 22 during the calibration procedure. The sensor 30 is removed from the screen 22 after calibration is complete to prepare the VDT 20 for normal operation. A signal cable 32 connects the sensor 30 to the CPU 50 (FIG. 1). The color calibration sensor may include features that enhance the calibration process. It is desirable that the sensor elements of the color calibration sensor 30 be placed in a consistent relationship to the surface of the display screen 22 and the test images displayed thereon.

Figure 7:
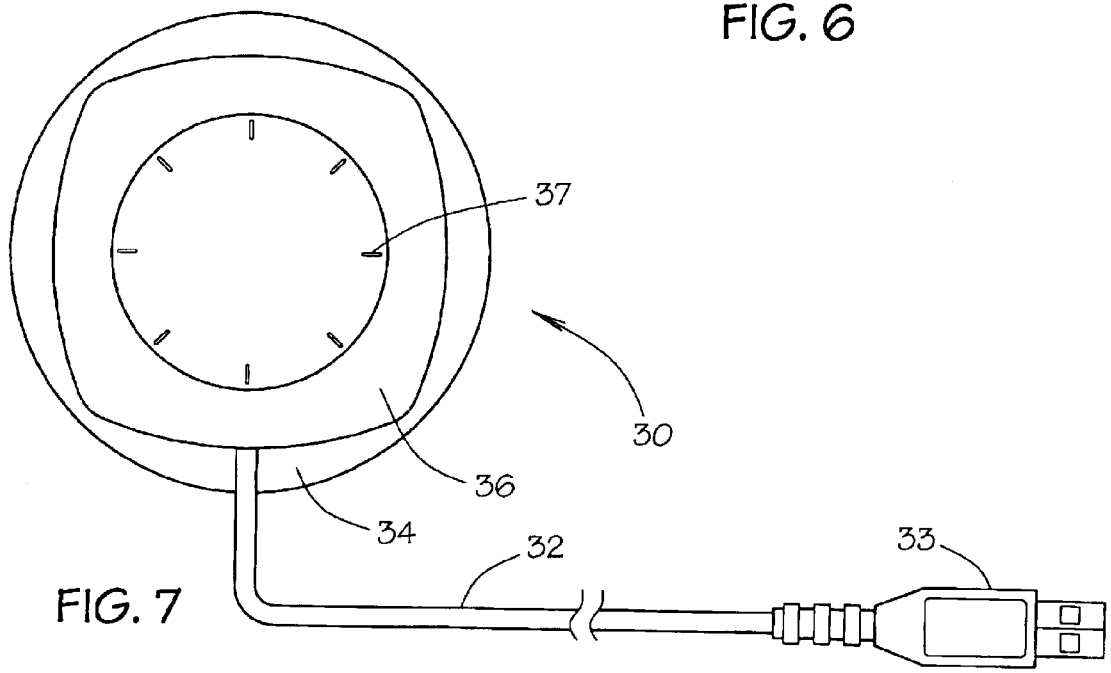
FIG. 7 is a plan view of a color calibration sensor.
Figure 8:
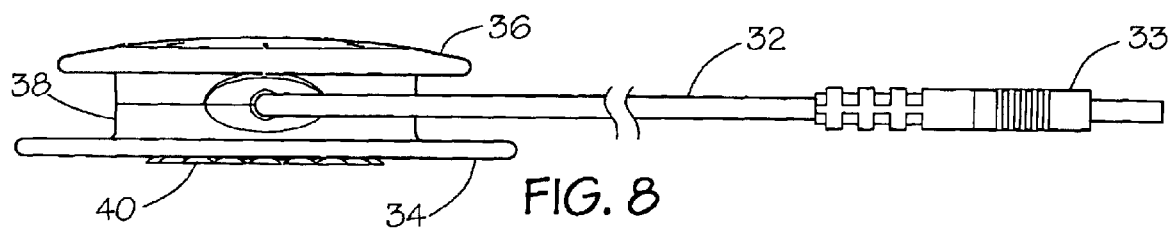
FIG. 8 is a side view of the color calibration sensor of FIG. 7.

As shown in FIGS. 7 and 8, the color calibration sensor 30 may be in the form of a spool with a bottom flange 34 and a top flange 36 joined by a cylindrical core section 38. This configuration may permit the signal cable 32 to be connected to the core section 38 and wound onto the core section between the flanges for storage. The signal cable 32 may be connected to the core section 38 by passing through an opening in the outer cylindrical surface of the core section and being connected to a circuit board within the core section. The signal cable 32 may provide a connector 33, such as a universal serial bus (USB) connector, to connect the color calibration sensor 30 to the CPU 50 (FIG. 1).

The bottom flange 34 may be larger than the top flange 36 as shown in FIGS. 7 and 8. The top flange 36 may provide a finger grip for attaching and removing the color calibration sensor 30 on the display screen 22 of the VDT 20. The larger bottom flange 34 may provide a finger shield to reduce finger contact and consequent marking on the display screen 22. The top flange 36 may be of a non-circular shape that encourages placement of the color calibration sensor 30 in a consistent angular orientation in successive attachments. The top flange 36 may include angular indicia 37 that may cooperate with a displayed image to further encourage a consistent angular orientation of the color calibration sensor 30.

Figure 9:
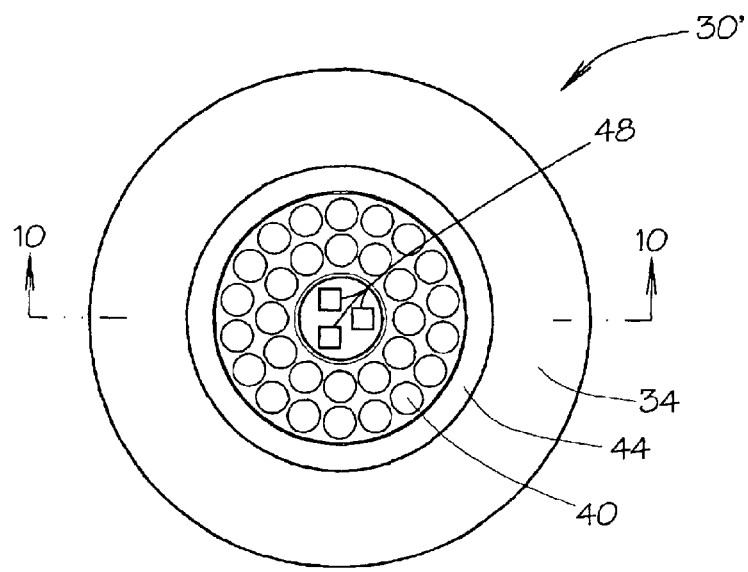
FIG. 9 is a bottom view of another embodiment of a color calibration sensor.
Figure 10:
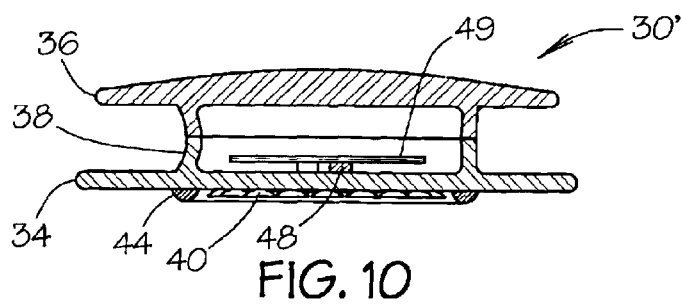
FIG. 10 is a cross section of the color calibration sensor of FIG. 9.

The bottom flange 34 may be formed from a material that is transparent or translucent. This may allow the color calibration sensor 30 to be positioned on the display screen 22 of the VDT 20 with reference to a target displayed thereon. As shown in FIGS. 9 and 10, a transparent or translucent bottom flange 34 may allow mounting of the sensor elements 48 within the core section 38 without requiring a special aperture to allow the light output on the display screen 22 to reach the sensor elements 48. The sensor elements 48 may be mounted to a circuit board 49.

A number of suction cups 40 may be provided on the bottom flange 34 to allow the color calibration sensor 30 to be temporarily attached to the display screen 22 of the VDT 20. The suction cups 40 are highly compliant and allow substantial variability in the positional relationship between the sensor elements 48 and the display screen 22, particularly between successive attachments to the screen.

Figure 11:
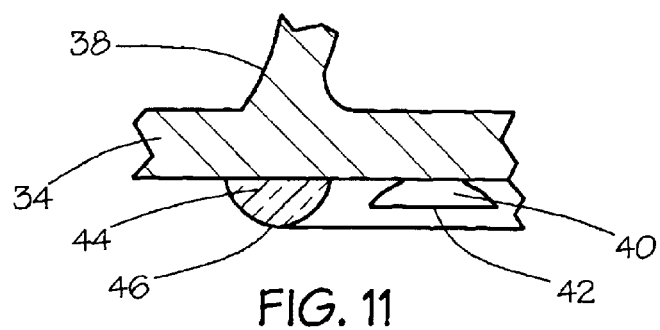
FIG. 11 is a detail from the cross section of FIG. 10.

In one embodiment of the color calibration sensor 30' shown in FIGS. 9 and 10, a light seal 44 may surround the suction cups 40 and the sensor elements 48. The light seal shields the display screen 22 from ambient light adjacent the sensor elements 48. As best seen in the portion of lower flange shown in FIG. 11, the bottom surface 46 of the light seal 44 may extend below the bottom surface 42 of the suction cups 40. The light seal is compressed to bring the suction cups into the attached position on the display screen 22. This creates an attachment where the light seal is pushing the sensor away from the screen while the suction cups are pulling the sensor toward the screen. This push-pull relationship may provide a more consistent positional relationship between the sensor elements 48 and the display screen 22.

The light seal 44 may be formed from synthetic or natural rubber, or thermoplastic elastomers having a hardness of Durometer 60 or below. The hardness may be chosen depending on the surface of the display screen 22. The bottom 46 of the light seal 44 may extend below the bottom surface 42 of the suction cups 40 by about 0.7 millimeter. The extension of the light seal may depend on the hardness of the seal material. The light seal 44 and the suction 40 cups may be formed as a single piece or in separate pieces.

Figure 12:
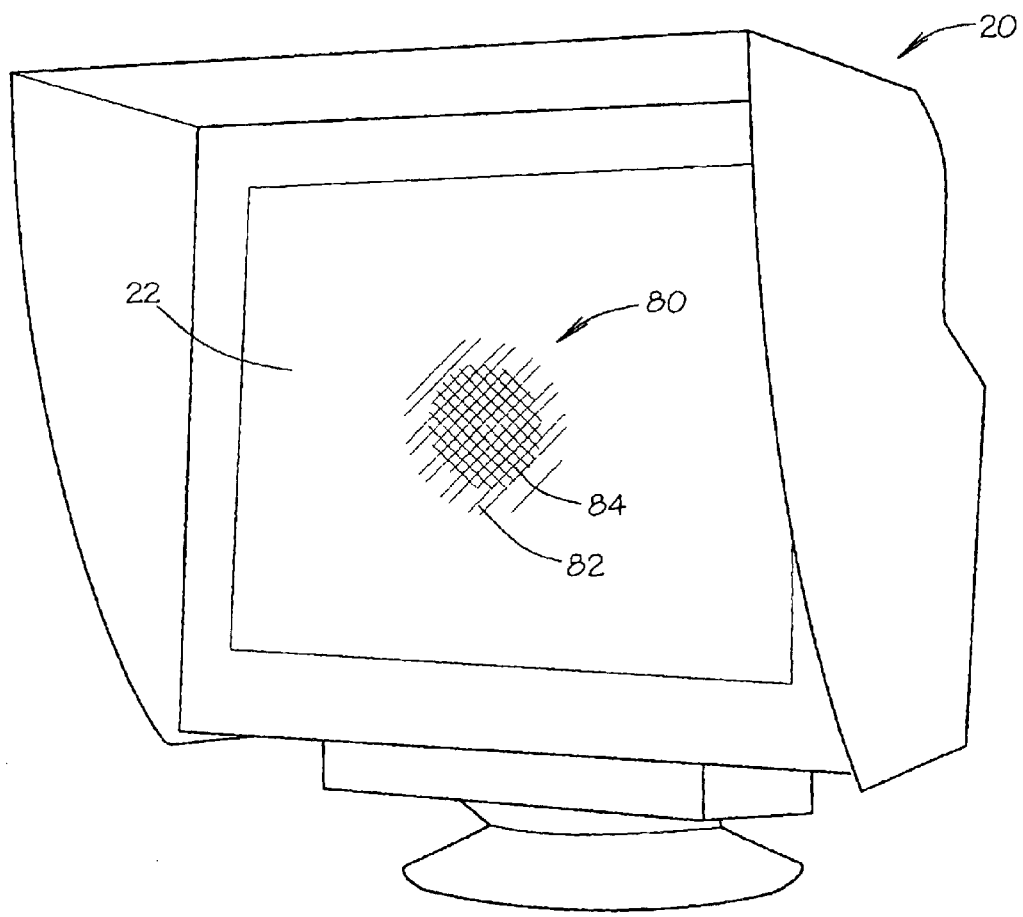
FIG. 12 is perspective view of a VDT with a test target image displayed.

The CPU 50 calibrates the VDT 20 by adjusting the gain 54 and bias 56 responsive to a light output signal 58 produced by the color calibration sensor 30 in response to test images displayed on the VDT. In one embodiment, each test image 80 is in the form of a circular patch 84 of uniform color surrounded by a ring 82 of a second uniform color, as shown in FIG. 12 with the color calibration sensor removed to reveal the test image. The balance of the display screen 22 may be of a third uniform color. The patch is of a size that will allow the sensor elements 48 (FIG. 9) to respond only to the light output of the patch. The patch may extend beyond the light seal 44 (FIG. 10). The ring 82 may be sized similarly to the bottom flange 34 of the color calibration sensor 30 as a positioning aid. The ring may provide an approximation of the average illumination of the display screen 22 during normal operation. While the light seal 44 may prevent ambient light from falling on the test patch 84, the internal reflections of the display screen may allow the light output from the ring area 82 surrounding the test patch 84 to contribute to the light output produced in the test patch.

Figure 13:
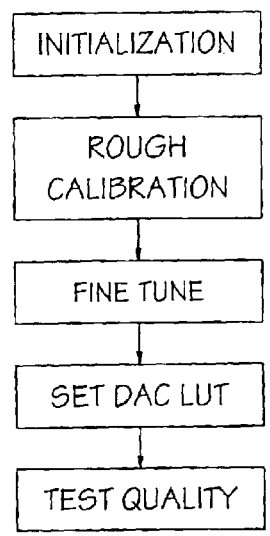
FIG. 13 is a flowchart of the calibration procedure.

FIG. 13 is a flowchart of the major activities in a calibration procedure used by an embodiment of the invention. A digital to analog converter lookup table (DAC LUT) may be used to convert the intensity inputs to analog output signals to provide a definable relationship between the intensity inputs and the light output on the display screen. In another, embodiment, a DAC LUT is not used.

During initialization, the CPU 50 may send commands to the VDT 20 to condition the VDT prior to calibration. Conditioning commands may include degaussing and warming up the circuitry and color guns of the VDT. Target values for the desired display characteristics—such as white point, black point, and gamma—may be obtained from stored values or from operator input. For example, with reference to the Commission Internationale d'Eclairage (CIE) xyY color model, a white point of 0.345, 0.359, 24.81 foot-lamberts (Ft-L), and a black point of 0.345, 0.359, 0.09924 Ft-L, with a gamma of 1.8 might be specified. These values specify two points of the same chromaticity (color) at two extremes of luminance (brightness) and a relationship between input values and output light levels between those two extremes.

During initialization, the CPU 50 may obtain the calibration values presently set in the VDT 20 so that these values may be restored if the calibration process is terminated prematurely. The CPU 50 may set the calibration values in the VDT 20 to a known set of starting values. If a DAC LUT is used, the table may be initialized to provide a linear relationship between the digital inputs and the analog output, or the use of the LUT may be disabled to provide the linear relationship. All intensity, gain, and bias values of the VDT 20 may be set to zero and the input of the color calibration sensor 30 may be read by the CPU 50; if the input of the color calibration sensor is greater than a predetermined amount, the calibration process will be terminated because there may be too much ambient light falling on the display screen 22. Whenever the calibration process is terminated prematurely the calibration values in the VDT 20 are restored to their pre-calibration values.

During initialization, the CPU 50 may measure the colors produced by phosphors on the display screen 22. The CPU 50 may set the VDT with a maximum intensity input in one color channel for the test patch 84, set the bias and gain of that color channel to known values, such as bias of 127 and gain of 255, with 255 being the maximum value, and set the bias and gain of the remaining channels to the minimum value, such as 0. The CPU 50 may then read the signal of the color calibration sensor 30 to establish the color produced by each of the phosphors for later use in the calibration procedure.

During initialization, the CPU 50 may determine target values and other values to be used in the calibration process. An XYZ transform matrix white reference may be set to D50, which has chromaticity of 0.346, 0.359, independent of any color space target. A target gamma may be computed from the target black value. Target luminance values for the white and black points may be computed.

The rough calibration calibrates each of the color channels independently. For the color channels not being calibrated, the CPU 50 holds the intensity 52, gain 54, and bias 56 at their minimum values, such as zero. The CPU 50 may begin the rough calibration of a color channel by setting the intensity 52 for that channel to its maximum value over the entire display screen 22 for a period of time.

The CPU 50 may then set a test image 80 for the color channel to calibrate the gain by setting the test patch 84 to the maximum intensity, such as 255, for the color channel being calibrated. The ring 82 may be set to an intermediate intensity, such as 127, for the color channel being calibrated. The remainder of the display screen 22 may be set to a low intensity, such as 63, for the color channel being calibrated. The CPU 50 may then set the gain 54 for the color channel being calibrated by iteratively increasing and decreasing the gain until a single unit change in the gain causes a transition between a luminance above the target luminance to luminance below the target.

The CPU 50 may then set a test image 80 for the color channel to calibrate the bias by setting the test patch 84 to a low intensity for the color channel being calibrated. The ring 82 and the remainder of the display screen 22 may be set to a minimum intensity for the color channel being calibrated. The CPU 50 may then set the bias 54 for the color channel being calibrated by iteratively increasing and decreasing the bias until a single unit change in the bias causes a transition between a luminance above the target luminance to luminance below the target.

The CPU may repeat the calibration of gain and bias one or more additional times to accommodate the interaction between these calibrations. Each of the color channels is calibrated in turn using the same method.

Fine tuning of the calibration is accomplished by calibrating all color channels together with reference to the white and black target points. The CPU 50 may begin the fine tuning by setting the intensity 52 for all channels to their maximum values over the entire display screen 22 for a period of time. The CPU 50 may then test the rough calibration by measuring the light output with all channels at maximum intensity, white, low intensity, dark, and minimum intensity, black. The test images for these tests may fill the display screen 22 with a low intensity gray, such as all channels having an intensity input of 63. The ring 82 may be an intermediate gray, such as 127. The test patch 84 is set successively to maximum intensity, such as 255, low intensity, such as 63, and minimum intensity, such as 0. If the test of the rough calibration is outside of the predetermined tolerances, the calibration is terminated prematurely.

If the rough calibration is within tolerance, the CPU 50 displays a white test patch 84 with the intensity 52 for all channels set to their maximum values. The gain 54 for each of the color channels is adjusted to match the test patch 84 to the target white point.

The gain 54 for each of the color channels may first be adjusted to match the luminance of the test patch 84 to the luminance of the target white point. A correction value is applied to the gain 54 for each of the color channels iteratively to bring the difference in luminance of the test patch 84 and the target white point within a tolerance. The correction value may be proportional to the observed difference in luminance and to the present gain value for each channel. If the difference cannot be brought within tolerance after a predetermined number of iterations, the calibration may be terminated prematurely.

The gain 54 for each of the color channels may then be adjusted to match the chromaticity of the test patch 84 to the chromaticity of the target white point. The signal input 58 from the color calibration sensor 30 may be translated to RGB values for the purposes of the fine tuning. In the RGB representation, the light output is represented by three values that correspond to the intensity of each of the three additive primary colors—red, green, and blue. Likewise, the white point target value may be translated to an RGB representation. A correction value is applied to the gain 54 for each of the color channels iteratively to bring the difference in chromaticity of the test patch 84 and the target white point within a tolerance. The correction value for each color channel may be proportional to the difference between the observed intensity for that color channel and the target intensity for that channel. The correction value for each color channel may be inversely proportion to the observed density of the test patch. If the difference in chromaticity cannot be brought within tolerance after a predetermined number of iterations, the calibration may be terminated prematurely. The tolerance may be a predetermined value or may be a value that can be configured by the user.

The CPU 50 may then displays a black test patch 84 that may have the intensity 52 for all channels set to their minimum values. The bias 56 for each of the color channels is adjusted to match the test patch 84 to the target black point.

The bias 56 for each of the color channels may first be adjusted to match the luminance of the test patch 84 to the luminance of the target black point. A correction value is applied to the bias 56 for each of the color channels iteratively to bring the difference in luminance of the test patch 84 and the target black point within a tolerance. The correction value may be proportional to the observed difference in luminance and to the present bias value for each channel. If the difference cannot be brought within tolerance after a predetermined number of iterations, the calibration may be terminated prematurely.

The black test patch may have the intensity 52 for all channels set to a low intensity value, such as one-fourth or one-eighth of the maximum value rather than being a true black with the intensities at their minimum values. The black point may be adjusted by adjusting a display of dark gray so that the test patch has a measurable color. The target black point used for fine tuning may be derived from a true black point value according to the intensity value of the black test patch. The bias 56 for each of the color channels is adjusted to match the test patch 84 to the target black point.

The bias 56 for each of the color channels may then be adjusted to match the chromaticity of the test patch 84 to the chromaticity of the target black point. The black test patch may be adjusted to have the intensity 52 for all channels set to a low intensity value, such as one-fourth or one-eighth of the maximum value so that the test patch has a measurable color. It will be appreciated that at this stage of the calibration the luminance of the test patch can be increased with little to no effect on the color of the test patch. The signal input 58 from the color calibration sensor 30 may be translated to RGB values for the purposes of the fine tuning. In the RGB representation, the light output is represented by three values that correspond to the intensity of each of the three additive primary colors—red, green, and blue. Likewise, the black point target value may be translated to an RGB representation. A correction value is applied to the bias 56 for each of the color channels iteratively to bring the difference in chromaticity of the test patch 84 and the target black point within a tolerance. The correction value for each color channel may be proportional to the difference between the observed intensity for that color channel and the target intensity for that channel. The correction value for each color channel may be inversely proportion to the observed density of the test patch. If the difference in chromaticity cannot be brought within tolerance after a predetermined number of iterations, the calibration may be terminated prematurely.

The CPU 50 may display a white test patch 84 and compare the test patch 84 to the target white point. If the difference is greater than tolerance, the color channel gain is again fine tuned as described above. The CPU 50 may then display a gray test patch 84 and compare the test patch 84 to a target gray point, and then display a black test patch 84 and compare the test patch 84 to the target black point. If the difference in either gray or black is greater than tolerance, the color channel bias is again fine tuned as described above.

If a digital to analog converter lookup table (DAC LUT) is used to convert the intensity inputs to analog output signals to provide a definable relationship between the intensity inputs and the light output on the display screen, the DAC LUT may be established following the calibration of the bias and gain. In the inventive system the extreme points of the input to output relationship are set by the bias and gain. Thus the DAC LUT is set such that the digital inputs for black produce the minimum output level and the digital inputs for white produce the maximum output level. This operates the DAC LUT over its full range and provides the maximum resolution for the digital to analog conversion. After the bias and gain have been set by the calibration procedure, the DAC LUT is set to adjust the intermediate values to produced the desired relationship of intensity inputs to light output between the calibrated white point and black point. A gray target is displayed and measured. The DAC LUT correction is calculated and curve fitting is used to compute the full DAC LUT table. The resulting transfer function is then tested by setting and measuring a targets to confirm that the light output is within a tolerance that may be provided by the user.

The signal input 58 from the color calibration sensor 30 may be tested by the CPU 50 to verify that the sensor is correctly attached to the display screen 22 prior to or following any or all of the light output measurements. The color calibration sensor 30 may be able to detect the refresh frequency of the display screen and flag a sensor attachment error if the result is out of tolerance.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A color calibration system comprising:
    a visual display terminal (VDT) having a display screen and a plurality of color channels, each color channel having an intensity input, a bias input, and a gain input, the VDT to produce an image on the display screen responsive to the intensity input;
    a color calibration sensor optically coupled to the VDT providing values responsive to chromaticity and luminance of a test patch portion of the image on the display screen; and,
    a computer processing unit (CPU) electrically coupled to the VDT and the color calibration sensor to perform calibration of the VDT including setting the bias of each color channel to reduce the difference between a target black point and the test patch portion with the intensity input at a minimum value for each color channel.

2. The color calibration system of claim 1 wherein the color calibration sensor includes a top flange, a bottom flange, a cylindrical core section joining the top flange and the bottom flange, and a signal cable connected to the core section such that the signal cable may be wound onto the core section between the top flange and the bottom flange.

3. The color calibration system of claim 2 wherein the bottom flange is larger than the top flange.

4. The color calibration system of claim 2 wherein the bottom flange is formed from a material that is transparent or translucent.

5. The color calibration system of claim 1 wherein the color calibration sensor includes:
   a plurality of suction cups having a bottom surface that may be removably attached to the display screen; and,
   a light seal that surrounds the plurality of suction cups and having a bottom surface that extends below the bottom surface of the suction cups.

6. The color calibration system of claim 1 wherein performing calibration further includes increasing the intensity input to a low intensity value for each color channel of the test patch portion and setting the bias of each color channel to reduce the difference between a chromaticity of the target black point and the test patch.

7. The color calibration system of claim 1 wherein performing calibration further includes setting the gain of each color channel to reduce the difference between a target white point and the test patch portion with the intensity input at a maximum value for each color channel.

8. The color calibration system of claim 7 wherein performing calibration further includes setting a digital to analog conversion lookup table (DAC LUT) such that the intensity input at the maximum value for each color channel produces a maximum output of the DAC LUT and the intensity input at the minimum intensity value for each color channel produces a minimum output of the DAC LUT.

9. The color calibration system of claim 1 wherein performing calibration further includes testing the values provided by the color calibration sensor to determine if the color calibration sensor is correctly coupled to the display screen.

10. The color calibration system of claim 9 wherein the values provided by the color calibration sensor are tested to determine a refresh frequency of the display screen.

11. A method for color calibrating a visual display terminal (VDT) having a plurality of color channels, the method comprising:
    displaying an image on a display screen of the VDT, the image including a test patch portion with an intensity input at a minimum intensity value for each color channel;
    reading values responsive to chromaticity and luminance of the test patch portion of the image on the display screen with a color calibration sensor optically coupled to the VDT; and
    setting a bias of each color channel to reduce the difference between a target black point and the test patch.

12. The method of claim 11 further comprising increasing the intensity input to a low intensity value for each color channel of the test patch portion and setting the bias of each color channel to reduce the difference between a chromaticity of the target black point and the test patch.

13. The method of claim 11 further comprising setting a gain of each color channel to reduce the difference between a target white point and the test patch with the intensity input at a maximum value for each color channel.

14. The method of claim 13 further comprising setting a digital to analog conversion lookup table (DAC LUT) such that the intensity input at the maximum value for each color channel produces a maximum output of the DAC LUT and the intensity input at the predetermined low intensity value for each color channel produces a low intensity output of the DAC LUT, a ratio of the low intensity value to the maximum value being equal to a ratio of the low intensity output to the maximum output.

15. The method of claim 11 further comprising testing the values provided by the color calibration sensor to determine if the color calibration sensor is correctly coupled to the display screen.

16. The method of claim 15 wherein the values provided by the color calibration sensor are tested to determine a refresh frequency of the display screen.

17. A machine-readable medium comprising instructions which, when executed by a machine, cause the machine to perform operations including:
    displaying an image on a display screen of the VDT, the image including a test patch portion with an intensity input at a minimum intensity value for each color channel;
    reading values responsive to chromaticity and luminance of the test patch portion of the image on the display screen with a color calibration sensor optically coupled to the VDT; and
    setting a bias of each color channel to reduce the difference between a target black point and the test patch.

18. The machine-readable medium of claim 17 wherein the operations further include increasing the intensity input to a low intensity value for each color channel of the test patch portion and setting the bias of each color channel to reduce the difference between a chromaticity of the target black point and the test patch.

19. The machine-readable medium of claim 17 wherein the operations further include setting a gain of each color channel to reduce the difference between a target white point and the test patch with the intensity input at a maximum value for each color channel.

20. The machine-readable medium of claim 19 wherein the operations further include setting a digital to analog conversion lookup table (DAC LUT) such that the intensity input at the maximum value for each color channel produces a maximum output of the DAC LUT and the intensity input at the predetermined low intensity value for each color channel produces a low intensity output of the DAC LUT, a ratio of the low intensity value to the maximum value being equal to a ratio of the low intensity output to the maximum output.

21. The machine-readable medium of claim 17 wherein the operations further include testing the values provided by the color calibration sensor to determine if the color calibration sensor is correctly coupled to the display screen.

22. The machine-readable medium of claim 21 wherein the values provided by the color calibration sensor are tested to determine a refresh frequency of the display screen.

* * * * *